UNITED STATES PATENT OFFICE

E. S. HARRIS, OF PHILADELPHIA, PENNSYLVANIA.

IMPROVEMENT IN THE MANUFACTURE OF ARTIFICIAL AND PRESERVATION OF NATURAL FLOWERS.

Specification forming part of Letters Patent No. 96,587, dated November 9, 1869.

*To all whom it may concern:*

Be it known I, E. S. HARRIS, of Philadelphia, in the county of Philadelphia and State of Pennsylvania, have invented a new and useful Improvement in the Preservation of Natural Flowers; and that the following forms a full and exact specification of the same, wherein I have set forth the nature and principles of my said improvement, by which my invention may be distinguished from others of a similar class, together with such parts as I claim and desire to secure by Letters Patent.

My invention relates to the preservation of natural flowers; and consists in inclosing the same in a preparation of rice-paper, as hereinafter described.

In its dry and natural state, this substance is not pliable enough to be molded into a permanent shape, and it is necessary to subject it to the influence of heat and moisture in order to effect the object of my invention—to wit, the preservation of natural flowers. I therefore subject the raw rice-paper to the vapor of water, at or nearly at the boiling-point, and cut and mold the same, while under the influence of heat and moisture, in such a manner as to render it—to wit, the said rice-paper—adaptable to the parts of natural flowers, which I propose to preserve. After the said rice-paper has been rendered pliable, as aforesaid, I inclose the parts of the natural flower in a wrapper of the same, cutting and molding the said wrapper to represent the shape of the flower which it incloses, the whole manipulation taking place under the influence of the vapor-bath described.

The facility with which rice-paper can be colored, and the resemblance of its texture to that of the petals of natural flowers, augment its value as a material for the preservation of natural flowers, as aforesaid.

I do not claim the process, herein described, of rendering rice-paper flexible, irrespective of the object to which it is applied; nor do I claim, broadly, the preservation of natural flowers by the external application of any substance other than rice-paper.

What I claim, and desire to secure by Letters Patent, is—

The process, herein described, of preserving the substance of natural flowers by the application of rice-paper.

E. S. HARRIS.

Witnesses:
    CHAS. E. PANCOAST,
    C. C. KLEIN.